United States Patent [19]

Campbell

[11] Patent Number: 5,951,712
[45] Date of Patent: Sep. 14, 1999

[54] METHOD FOR PLASTIC WASTE RECLAMATION AND PRODUCT PRODUCED THEREBY

[76] Inventor: Jerome Campbell, 1269 Eo Rd. 158, Heflin, Ala. 36264

[21] Appl. No.: 08/775,419

[22] Filed: Dec. 31, 1996

[51] Int. Cl.⁶ .................................................. B02C 23/08

[52] U.S. Cl. ...................... 2654/37.33; 264/5; 241/24.12; 241/18; 241/29; 241/65; 241/81; 585/241

[58] Field of Search ................... 260/2.3, 16; 264/209.3, 264/211.21, 37.33, 5; 585/241; 241/24.12, 18, 29, 65, 81

[56] References Cited

U.S. PATENT DOCUMENTS

| | | | |
|---|---|---|---|
| 3,857,799 | 12/1974 | Ooba et al. | 260/2.3 |
| 5,639,937 | 6/1997 | Höver et al. | 585/241 |

*Primary Examiner*—Laurie Scheiner
*Attorney, Agent, or Firm*—Hamilton, Brook, Smith & Reynolds, P.C.

[57] ABSTRACT

A novel method for processing plastic waste and polyresin, particularly polyethylene, into usable plastic products is described. Plastic waste such as wire fluff generated as a by-product from wire-chopping operations can be used in the process. Also described are products obtained by the process.

27 Claims, 2 Drawing Sheets

5,951,712

METHOD FOR PLASTIC WASTE RECLAMATION AND PRODUCT PRODUCED THEREBY

BACKGROUND OF THE INVENTION

Plastic waste from wire recycling is generated on the order of tons annually. It is typically a compilation of waste from many wire housing types and comprises difficult or inseparable components, including polyethylene (PE), nylon, rubber, thermosets, crosslinkers and polyvinyl chloride (PVC). This post-industrial waste is typically disposed of in landfills. With decreasing landfill space and public concern over the potential leaching of hazardous wastes from plastic wastes in landfills, efforts have been made to develop schemes for recycling plastic waste or certain of its useful components. However, the costs required to recover recyclable plastic from recycling residues may make such processes prohibiting expensive. For example, plastics from wire choppings and electrical wire are segregated into polymer type, such as PVC and PE, and reprocessed into a variety of industrial products (U.S. Pat. No. 5,022,985; Plastic Recovery Systems). The remainder of components which are not reusable are disposed of in landfills.

There exists a need for alternative methods for reclaiming plastic waste in a cost effective manner which utilizes the entire waste generated from wire chopping operations. Such methods would alleviate landfill crowding and toxic waste leaching in the landfill.

SUMMARY OF THE INVENTION

This invention pertains to a method for recycling plastic waste into usable plastic objects, and to products generated by the novel process. According to the process, plastic waste and a polyresin, such as polyethylene (PE), are dry mixed together and then processed through a molten plastic supply under adequate conditions of temperature, pressure and compression to create a molten plastic material comprising plastic waste and polyresin which can subsequently be formed into any desired shape. Preferably, the plastic waste is wire fluff which is typically generated as a by-product from the recycling of wire contained in electrical or telephone wire or cable jacketing. In a preferred embodiment, the amount of plastic waste that can be mixed with PE will be from about 5% to about 90% by weight depending upon end use of the product and can have a particle size of from about 100 microns to about 2 inches in diameter.

The plastic product produced by the method of this invention is extrudable, resilient and is capable of withstanding environmental temperature changes without distorting the product's shape. A plastic product comprising wire fluff and PE is impervious to insects. Further, acid present in concrete is known to not affect PE integrity. Examples of suitable products include but are not limited to seawalls, retaining walls, landscaping barriers, parking stops, fence posts, spacers between guard rail and guard rail posts and spacers at rail crossings between the rails. Alternatively, the plastic product can be made in the form of pellets or the like which can subsequently be molded into any desired shape/product.

An advantage of the novel process is that it provides an alternative means for recycling plastic waste, which would otherwise be destined for landfills, into usable products.

DETAILED DESCRIPTION OF THE INVENTION

Figure 1:
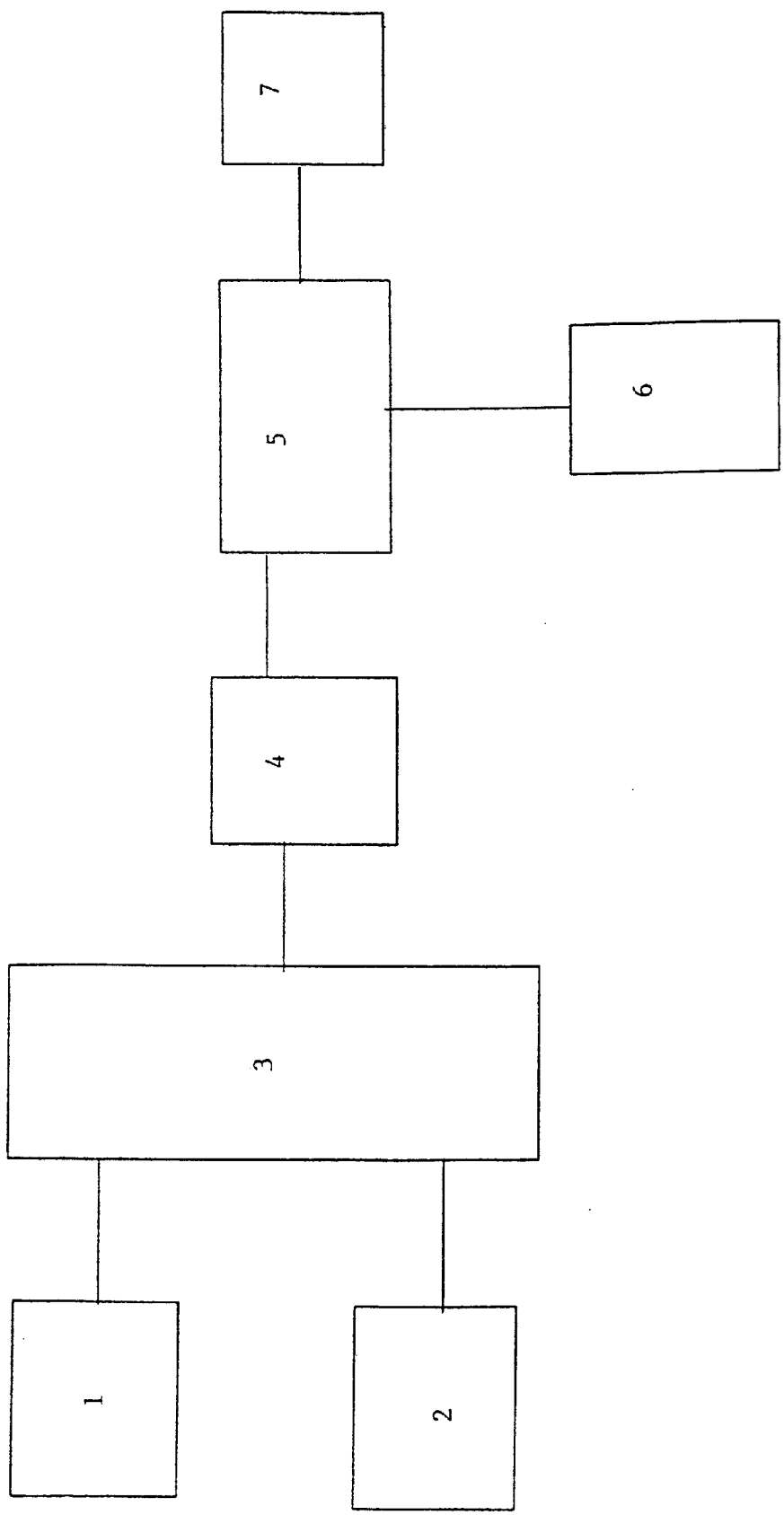
FIG. 1 is a schematic representation for a preferred embodiment of the process using an extruder as the molten plastic supply.

The invention pertains to a method for recycling plastic waste, which would otherwise be destined for disposal in landfills, into useful plastic objects. The plastic material resulting from the novel process is also described.

Plastic waste is intended herein to mean any plastic containing material that is generated into industrial waste, such as from wire chopping, wire grinding or wire shredding, bag house collectors and waste plastic from recycled non-ferrous wire cable. The plastic content of the waste is not critical for the process to be carried out. For instance, the plastic waste can comprise any one of or a combination of PVC, rubber, PE, nylon, thermosets and crosslinkers. Because the plastic waste can be a compilation of waste from many sources, it is often unknown without chemical analyses, as to the exact chemical constituents contained within the plastic waste. The process disclosed herein does not require knowledge of the exact chemical make-up of the plastic waste, as the process is designed to utilize plastic waste from any source, regardless of its highly variable chemical make-up. Some possible sources of plastic waste include carpet grindings, purgings from other plastic manufacturers and post-consumer plastic waste. Another unique feature of the novel process is that the entire plastic waste can be reclaimed, thus reducing material which ends up in landfills.

A particularly preferred plastic waste is that generated as a by-product of non-ferrous wire-chopping operations. The by-product is typically referred to in the waste industry as "wire fluff" or waste plastic from recycled non-ferrous wire cable. Wire fluff also varies in its chemical constituents and can comprise any thing that is commonly used to make electrical and telephone wires. Tons of wire fluff are generated annually and thus provides a readily available supply for use in the process of the invention. The size of the wire fluff particles should be within the range of from about 100 microns to about 2 inches in diameter. This will facilitate further processing of the molten plastic material without causing the molten plastic supply (e.g., extrusion or injection molding equipment) to clog. Particle size can be reduced into the suggested range by grinding the wire fluff into the desired size depending upon end product processing equipment.

The plastic products of this invention also comprise a polyresin. The term "polyresin" is intended to embrace any polymeric resin which is capable of liquefying under the same conditions that cause the plastic waste to co-liquify using the novel process. In other words, the polyresin and plastic waste must be compatible with the process to produce a molten plastic material that can subsequently be shaped. Suitable polyresins that can be used in the process include but are not limited to polyamide, polyamide-imide, polybutylene, polycarbonate, polyester, polyetheretherketone, polyetherimide, polyethylene, PECTFE, PE-TFE, poly (ethylene terephthalate) (PET), polypropylene, polystyrene, PTFE, polyurethane, polyvinylidene fluoride, vinyl or combination thereof. The amount of polyresin to plastic waste can readily be ascertained by the skilled artisan and will be determined by the end product desired and its intended use. Product strength can be regulated by the density (e.g., product strength increases with polyresin density) of the plastic material and as such one skilled in the art can select the polyresin type and density using contemporaneous knowledge.

Polyethylene is the most preferred type of polyresin for use in the novel process. The term "polyethylene" is intended to embrace virgin polyethylene or polyethylene which is obtainable from a recycling process. It is not essential that the PE used in the process be substantially free of other contaminating materials, such as other plastic or polymer types. If such contaminants are present, the ratio of plastic waste to PE can be adjusted accordingly to compensate for the percentage of contaminant in the PE. For example, if the PE has a 5% by weight contaminant then the blend would be 35% PE to 65% plastic waste. It is believed that PE is the preferred polymer of choice in the present invention because it is stable to environmental conditions, will not biodegrade and will not leach toxic materials into the environment over time. A preferred PE will be of medium to high density to make a product that is strong.

The remainder of the invention will be discussed in the context of using wire fluff as the plastic waste and polyethylene as the polyresin. This is merely for illustration purposes and should not be construed as a limitation on the type of plastic waste that can be reclaimed by the current process.

According to the process, wire fluff and polyethylene are separately fed into a mixer in a ratio of fluff to PE that is suitable to produce a product that is resilient and has the integrity of an extruded or molded plastic. The exact ratio of wire fluff to PE will depend upon the desired end use of the product. The resultant plastic will typically comprise of from about 5% to about 90% by weight wire fluff, with a ratio of about 70% by weight wire fluff to about 30% by weight PE being most preferred. If the wire fluff exceeds the upper weight limit, the product tends to be brittle because there is not enough plastic in the wire fluff to maintain the integrity of the product. The wire fluff extends the PE so that less PE is required. In essence the wire fluff serves as a filler or additive in the final product.

Any mixer/blender can be used provided that the PE and wire fluff are dry mixed together. The materials should be mixed/blended for a period of time sufficient to integrate the two components together into a dry plastic composite mixture, although uniformity or homogeneity of the mixture is not essential. The conditions for mixing do not need to be stringent, i.e, shear conditions are not required, since the objective is to achieve integration of the two components into a mix that will be delivered downstream to means for obtaining a molten plastic material, such as an extruder or injection mold system. The amount of mix time will vary depending upon the ratio of PE to wire fluff used. One skilled in the art can adequately ascertain the blend time needed. Typically, a blend time of about 10 minutes is adequate for a 70:30 weight percent ratio of wire fluff: PE.

The moisture content of the plastic composite material fed through the extruder or injection molding system should be from about 0% to about 20% moisture, with 0% being preferred. This is controlled by dry blending the plastic ingredients together rather than wet blending. Controlling the moisture content will result in a product that is more uniform. Too much moisture will yield a plastic product that has voids created from water vapor generated when the plastic is liquified. If moisture is present in the composite material, it is desirable to use a vented system to release water vapor.

Once adequately mixed together, the dry composite plastic mixture, e.g., wire fluff, is delivered either (1) to a holding tank which serves as a reservoir for continuous on-line processing; or (2) directly to a molten plastic supply for batch processing. Any type of shear or mechanical machinery or process that can liquify the composite plastic mixture can be used as the molten plastic supply, for example an extruder or injection mold system. If a holding tank is used, the dry composite plastic mixture can then be delivered to the extruder or injection mold system as needed. It may optionally be desirable to add talc to the composite mixture residing in the holding tank in an amount sufficient to maintain the free flowing nature of the composite mixture. A preferred amount of talc is from about 0.5% to about 1.0% by weight, with about 1% by weight being particularly preferred. Precautions should be taken to prevent combustive conditions within the holding tank. Such precautionary measures are readily apparent to the skilled artisan.

In one embodiment, the means for obtaining molten plastic material is an extruder. The extruder can be any screw type extrusion equipment, provided that certain operating parameters are controlled. It is critical to maintain the internal temperature of the extruder below the flammable point of PVC, (a component contained in the wire fluff) which is known to be volatile at 375° F., to prevent combustion thereof. Typically the temperature should be maintained at from about 300° F. to about 400° F., with 350° F. being most preferred. The exact temperature at which the plastic composite material can be processed will depend upon the weight percentage of PVC present in the wire fluff and the amount of PE used. If the PE content is high, in either the wire fluff or a high ratio of PE is used, then the internal extruder temperature can withstand temperatures at the upper temperature range provided above. The temperature will also dictate the speed with which the material will pass through the extruder. This will be a matter of process design for the skilled artisan depending upon the manner in which the molten plastic will be further processed.

Another parameter which must be regulated is the compression ratio, i.e., the ratio of the length of the screw to its diameter. For example, an 8 inch diameter extruder should preferably be operated at below a 28 to 1 compression ratio to prevent PVC combustion in the screw. Ratios larger than this pose an explosive hazard. Compression should not exceed 4.0 and preferably should be from about 2.5 to about 3.0.

The third parameter is pressure but this is dictated by the equipment used downstream in the process. One skilled in the art can ascertain the operative pressure conditions depending upon equipment design.

The time through the extrusion screw is not significant and can be regulated by temperature as discussed above or the type of equipment used. The rate at which the plastic composite material passes through the extruder will more importantly be dictated by the plastic processing equipment that can handle the molten material downstream from the extruder. Any means for shaping/molding the plastic can be used and are well within the contemporaneous knowledge of the skilled artisan. An extrusion system is particularly preferred but an injection molding system can also be suitable if the particle size of the molten plastic is sufficiently small to avoid clogging of the injector valves, as discussed above. Profiling does not work well because the material exiting the screw is not homogeneous in its composition.

In a preferred embodiment, shown schematically in FIG. 1, plastic waste 1 and polyethylene 2 are separately delivered, e.g., by a screw or conveyor belt to a means for mixing 3, such as a blender. Once the plastic waste and polyethylene are adequately mixed together in the mixer 3, the resulting plastic composite mixture is delivered to a holding tank 4 where it resides until needed downstream in the process. The holding tank 4 is optional unless continuous on-line processing of the plastic composite mixture is desired. This will ensure a continuous source of the plastic composite mixture without interrupting operations, such as to accommodate batch mixing of the polyethylene and plastic waste that takes place in mixer 3. The composite mixture is then processed through a vented screw extruder 5 having a means for controlling operation parameters 6, such as a computer. The molten plastic exits extruder 5 to a means for forming/shaping 7 the molten plastic into products of desired shape and size depending upon end use.

Figure 2:
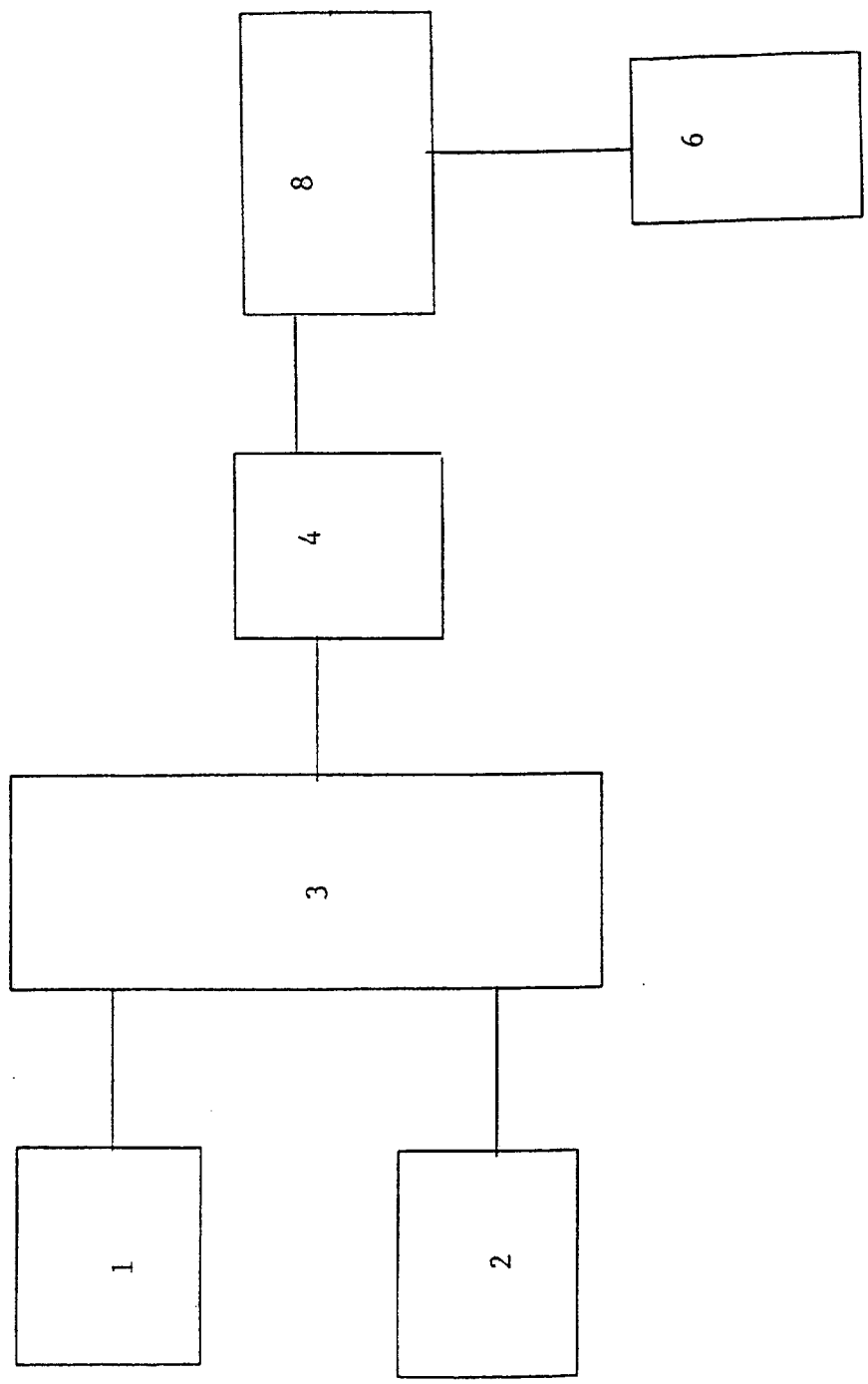
FIG. 2 is a schematic representation for a preferred embodiment of the process using an injection mold system as the molten plastic supply.

In another embodiment, shown in FIG. 2 the process can be used with an injection mold system 8. The remainder of components are similar to that shown in FIG. 1. One skilled in the art, using contemporaneous knowledge of injection mold systems or other molten plastic supply equipment, can readily ascertain operative conditions for use with the novel process.

The plastic product produced by the method comprises a plastic blend of polyresin and plastic waste (e.g., wire fluff) in a ratio which results in a product that has an integrity of plastic, i.e., it is not prone to breakage or falls apart because there is insufficient polyresin and/or plastic contained within the wire fluff to hold the product together. As stated above, this amount will depend upon product end use. For polyethylene, preferably the amount of wire fluff will be from about 5% to about 90% by weight, with 70% by weight being most preferred. The plastic material produced by the novel process is typically a grey to black hue, where the specific shade is dictated by the amount of polyethylene used. The material is resilient, is not prone to twisting or distorting, and is relatively inert to environmental conditions and excessive temperature fluctuations for long periods of time. This makes the product an excellent material for use outdoors in applications where the material is not required to maintain a weight load in the case where the polyresin is polyethylene. This is because the polyethylene-containing material does not possess adequate strength equivalent to that of wood. However, use of the plastic material in products which are typically made from wood are well within the contemplated uses of this invention. For example, the plastic material can be shaped into posts, timbers, 4×4 or 5×7 lumber equivalents for use as retaining walls to prevent/reduce erosion for instance, landscaping, parking stops, fence posts, guard rail spacers and railroad rail spacers. The plastic material is further relatively inert to water containing salt, acids or bases, which makes the material well suited for aquatic applications, such as retaining walls and sea walls.

EQUIVALENTS

Those skilled in the art will recognize, or be able to ascertain using no more than routine experimentation, many equivalents to the specific embodiments of the invention described specifically herein. Such equivalents are intended to be encompassed in the scope of the following claims.

I claim:

1. A method for producing a plastic product comprising the steps of:
    a) processing a mixture consisting essentially of polyethylene and wire fluff in an extruder to obtain a molten plastic, wherein the amount of wire fluff is from about 5% to about 90% by weight of the mixture; and
    b) forming the molten plastic into a plastic product.

2. The method of claim 1 wherein the wire fluff is present in the mixture at about 70% by weight.

3. A method for producing a plastic product, comprising the steps of:
    a) separately delivering plastic waste and polyethylene into a means for mixing;
    b) mixing the plastic waste and polyethylene together to form a composite plastic mixture;
    c) processing the composite plastic mixture through a molten plastic supply to obtain a molten plastic material; and
    d) forming the molten plastic material into a plastic product.

4. The method of claim 3 wherein in step (a) the plastic waste and polyethylene are delivered to the means of mixing in a ratio of from about 5% to about 90% by weight plastic waste and from about 95% to about 10% by weight polyethylene.

5. The method of claim 4 wherein the plastic waste is about 70% by weight and the polyethylene is about 30% by weight.

6. A method for producing a plastic product, comprising the steps of:
    a) processing a mixture comprising polyethylene, polyresin and plastic waste through a molten plastic supply to obtain a molten plastic material, wherein the polyresin is selected from the group consisting of polyamide, polyamide-imide, polybutylene, polycarbonate, polyester, polyetheretherketone, polyetherimide, polyethylene, poly(ethylene terephthalate), polypropylene, polystyrene, polyurethane, polyvinylidene fluoride and vinyl; and
    b) forming the molten plastic material into a plastic product.

7. The method of claim 6 wherein the plastic waste is wire fluff.

8. A method for producing a plastic product, comprising the steps of:
    a) separately delivering plastic waste, polyethylene and polyresin selected from the group consisting of polyamide, polyamide-imide, polybutylene, polycarbonate, polyester, polyetheretherketone, polyetherimide, polyethylene, poly(ethylene terephthalate), polypropylene, polystyrene, polyurethane, polyvinylidene fluoride and vinyl into a means for mixing;
    b) mixing the plastic waste and polyresin together to form a composite plastic mixture;
    c) processing the composite plastic mixture through a molten plastic supply to obtain a molten plastic material; and
    d) forming the molten plastic material into a plastic product.

9. The method of claim 8 wherein the plastic waste is wire fluff.

10. The method of claim 8 wherein the method is performed using an injection mold system or an extruder.

11. The method of claim 3 wherein the plastic waste is wire fluff.

12. The method of claim 3 wherein step (c) is performed at a temperature below the flammable point of polyvinyl chloride contained in the plastic waste.

13. The method of claim 12 wherein step (c) is preformed at a temperature of from about 300° F. to about 400° F.

14. The method of claim 13 wherein step (c) is performed at about 350° F.

15. The method of claim 3 wherein the method is performed using an injection mold system or an extruder.

16. A method for producing a plastic product, comprising the steps of:
   a) processing a mixture consisting essentially of polyethylene and plastic waste through a molten plastic supply to obtain a molten plastic material; and
   b) forming the molten plastic material into a plastic product.

17. The method of claim 16 wherein the plastic waste is wire fluff.

18. The method of claim 16 wherein the plastic waste is present in the mixture in an amount of from about 5% by weight to about 90% by weight of the mixture.

19. The method of claim 18 wherein the amount of plastic waste is about 70% by weight of the mixture.

20. The method of claim 16 wherein step (a) is preformed at a temperature below the flammable point of polyvinyl chloride contained in the plastic waste.

21. The method of claim 20 wherein the temperature is from about 300° F. to about 400° F.

22. The method of claim 21 wherein the temperature is from about 350° F.

23. The method of claim 16 wherein the method is performed using an injection mold system or an extruder.

24. A method for producing a plastic product, comprising the steps of:
   a) processing a mixture comprising polyethylene, polyresin and wire fluff through a molten plastic supply to obtain a molten plastic material, wherein the polyresin is selected from the group consisting of polyamide, polyamide-imide, polybutylene, polycarbonate, polyester, polyetheretherketone, polyetherimide, polyethylene, poly(ethylene terephthalate), polypropylene, polystyrene, polyurethane, polyvinylidene fluoride and vinyl; and
   b) forming the molten plastic material into a plastic product.

25. The method of claim 24 wherein the plastic waste is wire fluff.

26. A method for producing a plastic product, comprising the steps of:
   a) processing a mixture consisting essentially of polyethylene, polyresin and plastic waste through means for obtaining a molten plastic material to thereby yield a molten plastic material, wherein the polyresin is selected from the group consisting of polyamide, polyamide-imide, polybutylene, polycarbonate, polyester, polyetheretherketone, polyetherimide, polyethylene, poly(ethylene terephthalate), polypropylene, polystyrene, polyurethane, polyvinylidene fluoride and vinyl; and
   b) forming the molten plastic material into a plastic product.

27. A method for producing a plastic product, comprising:
   a) processing a mixture comprising polyethylene and plastic waste through means for obtaining a molten plastic material to thereby yield a molten plastic material; and
   b) forming the molten plastic material into a plastic product.

* * * * *